Dec. 30, 1930.  R. HILL  1,787,073
DOOR CONTROL APPARATUS
Filed Aug. 23, 1927  9 Sheets-Sheet 1

Fig.1

INVENTOR
Reuben Hill
BY
his ATTORNEYS

Dec. 30, 1930.                R. HILL                    1,787,073
                        DOOR CONTROL APPARATUS
                        Filed Aug. 23, 1927        9 Sheets-Sheet 2

INVENTOR
Reuben Hill
BY
his ATTORNEYS

Dec. 30, 1930.    R. HILL    1,787,073
DOOR CONTROL APPARATUS
Filed Aug. 23, 1927    9 Sheets-Sheet 3

INVENTOR
Reuben Hill
BY
his ATTORNEYS

Dec. 30, 1930.    R. HILL    1,787,073
DOOR CONTROL APPARATUS
Filed Aug. 23, 1927    9 Sheets-Sheet 4

INVENTOR
Reuben Hill
BY
his ATTORNEYS

Dec. 30, 1930.  R. HILL  1,787,073
DOOR CONTROL APPARATUS
Filed Aug. 23, 1927   9 Sheets-Sheet 6

INVENTOR
Reuben Hill
BY Cumpston & Griffith
his ATTORNEYS

Dec. 30, 1930.     R. HILL     1,787,073
DOOR CONTROL APPARATUS
Filed Aug. 23, 1927    9 Sheets-Sheet 7

INVENTOR
Reuben Hill
BY
his ATTORNEYS

Dec. 30, 1930. R. HILL 1,787,073
DOOR CONTROL APPARATUS
Filed Aug. 23, 1927 9 Sheets-Sheet 8

INVENTOR
Reuben Hill
BY
his ATTORNEYS

Dec. 30, 1930.   R. HILL   1,787,073
DOOR CONTROL APPARATUS
Filed Aug. 23, 1927    9 Sheets-Sheet 9

INVENTOR
Reuben Hill
BY
his ATTORNEYS

Patented Dec. 30, 1930

1,787,073

UNITED STATES PATENT OFFICE

REUBEN HILL, OF DETROIT, MICHIGAN, ASSIGNOR TO SARGENT & GREENLEAF, INC., OF ROCHESTER, NEW YORK, A CORPORATION OF NEW YORK

DOOR-CONTROL APPARATUS

Application filed August 23, 1927. Serial No. 214,969.

The present invention relates to door control apparatus and more especially to a closing and checking device for doors and has for an object the provision of a unitary device which is extremely compact so that it can be applied to the door jamb or casing or the door itself with a minimum amount of labor.

A further object is to provide a door closing device which, when installed within the door jamb or in the door, will be substantially concealed.

A further object is to provide a concealed door closing mechanism combined with a hinge element.

A further object of the invention is to provide a simple and effective mechanism for checking or retarding the closing movement of the door.

A further object is to provide all of the advantages of the usual exposed door closing devices in a concealed door closing device.

To these and other ends the invention resides in certain improvements and combinations of parts, all as will be hereinafter more fully described, the novel features being pointed out in the claims at the end of the specification.

In the drawings:

Fig. 6ª is a detail perspective view of a ratchet wheel and attached sleeve which cooperates with the master member.

Fig. 6ᵇ is a detail perspective view of the pin which supports the ratchet wheel and master member in position in the casing.

Similar reference numerals apply to similar parts throughout the specification.

Figures 14, 15, 16:
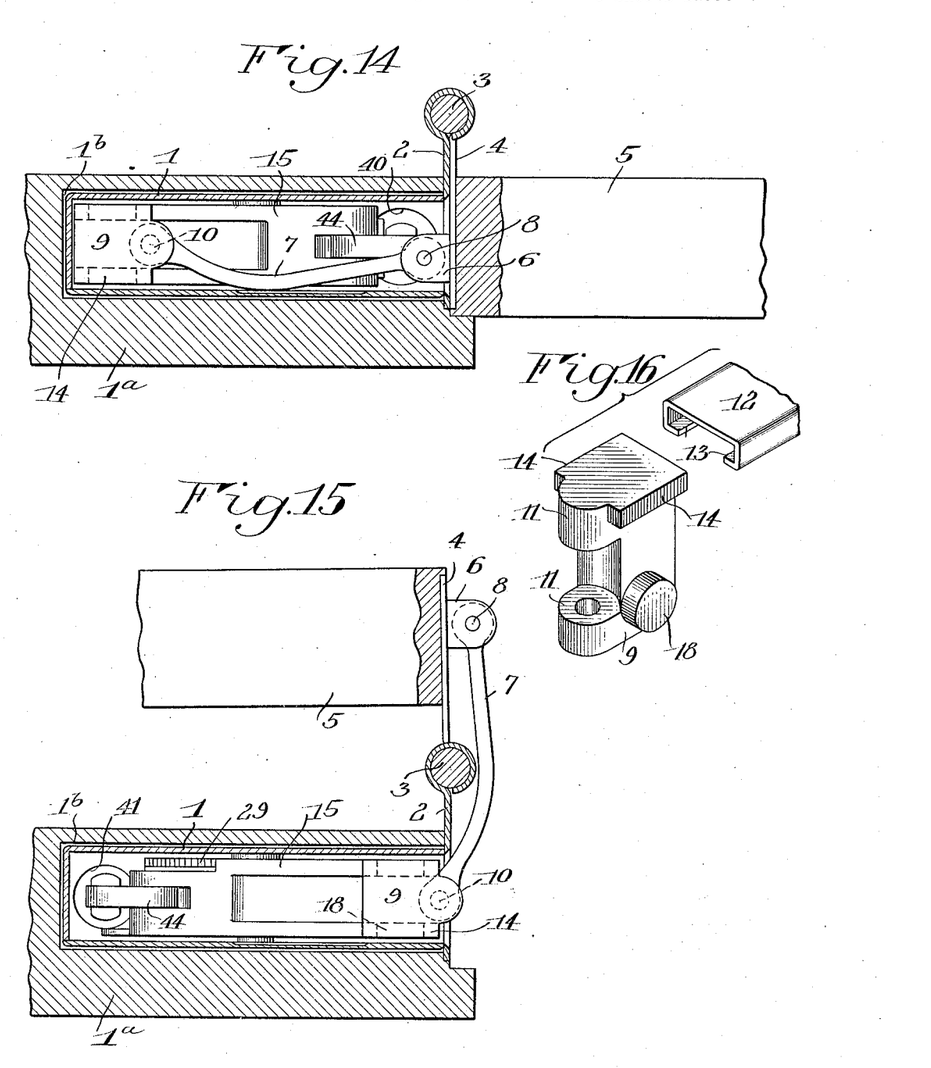
Fig. 14 is a horizontal section taken on the line 14—14 of Fig. 2 with the door in closed position.
Fig. 15 is a horizontal section similar to Fig. 14 showing the parts with the door in extreme open position.
Fig. 16 is a fragmentary detail showing the crosshead and guide therefor, the crosshead being removed from the guide for the sake of clearness.

Referring to the drawings, 1 designates generally the casing enclosing most of the operating parts of my device. The door jamb is indicated at 1ª and is suitably cut away at 1ᵇ to provide for the installation of the casing 1 therein as clearly shown in Figs. 1 and 14. The front or outer edge of the casing 1 may be provided with an outstanding portion 2 terminating in the usual knuckle for the insertion of the hinge pintle 3. The other hinge section 4 is constructed of any desired shape and is provided with the usual screw holes so that it may be secured to the door 5 in the usual manner. Outstanding lugs 6, 6 are formed on the face of hinge section 4 as seen best in Figs. 1, 14 and 15. A link element 7 is pivotally connected at one end to the lugs 6, 6 by means of a pin 8 secured at its ends in said lugs. The link 7 extends through an opening in the front of the casing 1 and is pivotally connected at its inner end to a crosshead 9 by means of a vertically positioned pin 10 having its ends secured in lugs 11, 11 formed on the crosshead, see Figs. 1, 5 and 16.

The crosshead 9 is guided for reciprocating movement at the top of the casing 1 by means of a channel shaped guide element 12 riveted to the top of the casing and having inturned portions 13, 13 which engage lugs 14, 14 on the crosshead 9.

Figure 11:
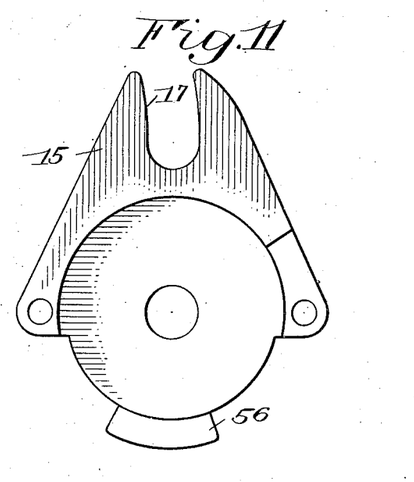
Fig. 11 is a detail of the master member or rotary cam element.
Figure 12:
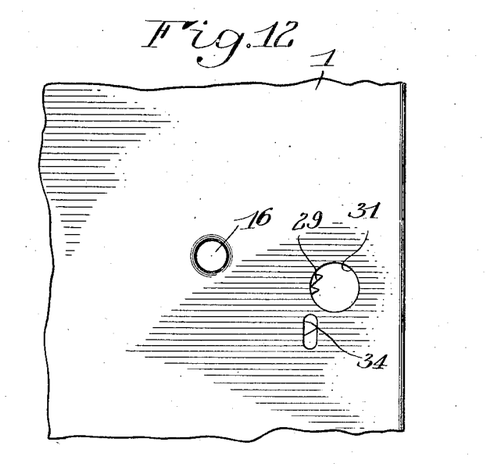
Fig. 12 is fragmentary view of a portion of the outer casing illustrating the positions of the holes for inserting a winding key and for releasing the holding pawl for the main spring.
Figure 13:
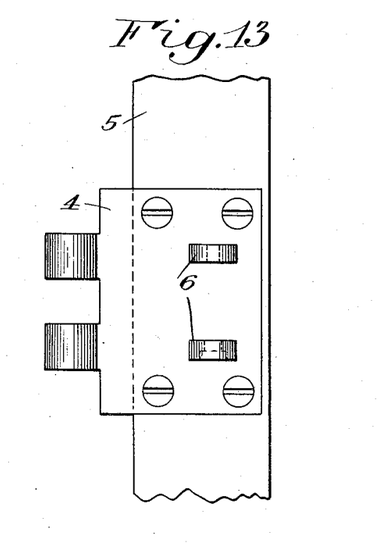
Fig. 13 is a detail of the hinge portion which is attached to the door.

The means for moving the crosshead in a direction to close the door comprises preferably a master member or cam element 15 pivotally mounted upon a pin 16 having its ends secured in the side walls of casing 1. The upper portion of the cam element is roughly of triangular shape (see Fig. 11) and at its apex it is provided with a cut out or slotted portion 17 which forms a sliding connection with crosshead 11 by means of lugs 18 on each side of the crosshead 11 which are engaged within the slot 17. It will be seen that the sides of the slot engage the lugs 18 to move the crosshead by means of a cam action. The particular shape of the element 15 as shown is not material, it being apparent that a crank connection between pin 16 and lugs 18 would serve the same purpose.

Figure 1:
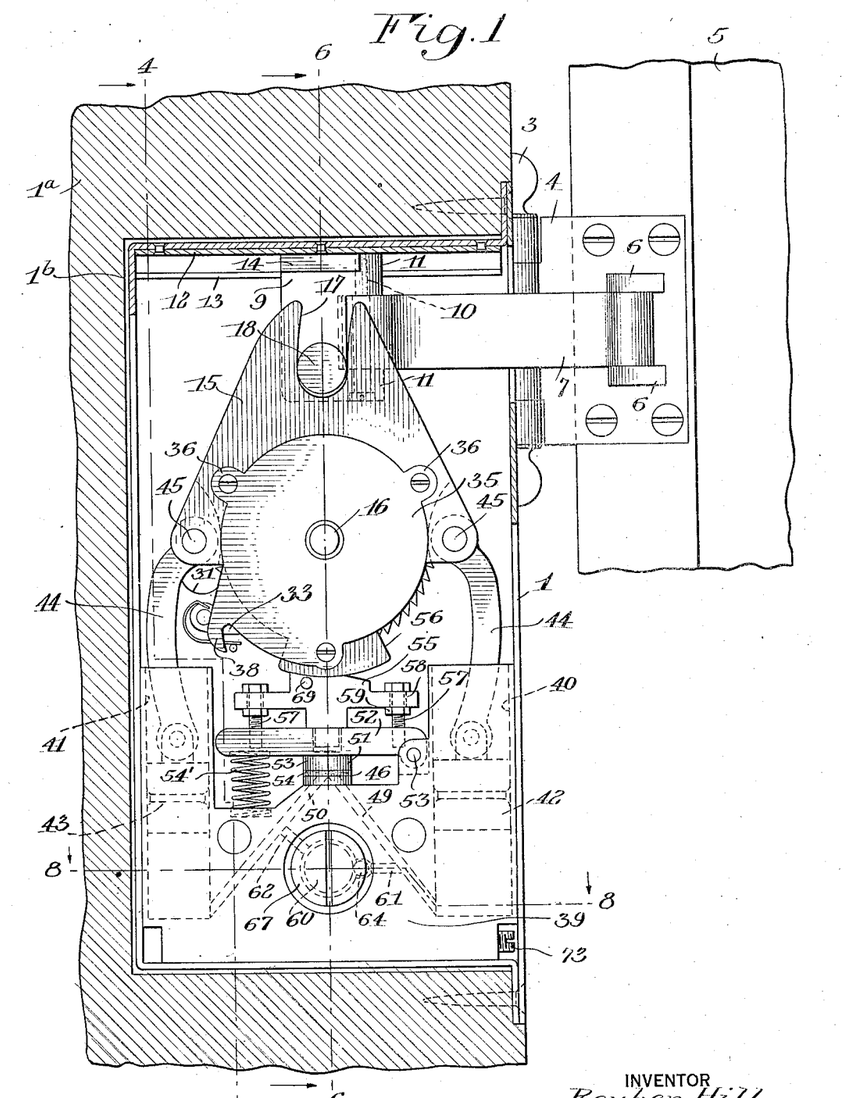
Fig. 1 is a sectional elevation of my device showing the parts as they are when the door is approximately halfway between extreme open and closed positions.
Figures 5, 6, 6A, 6B:
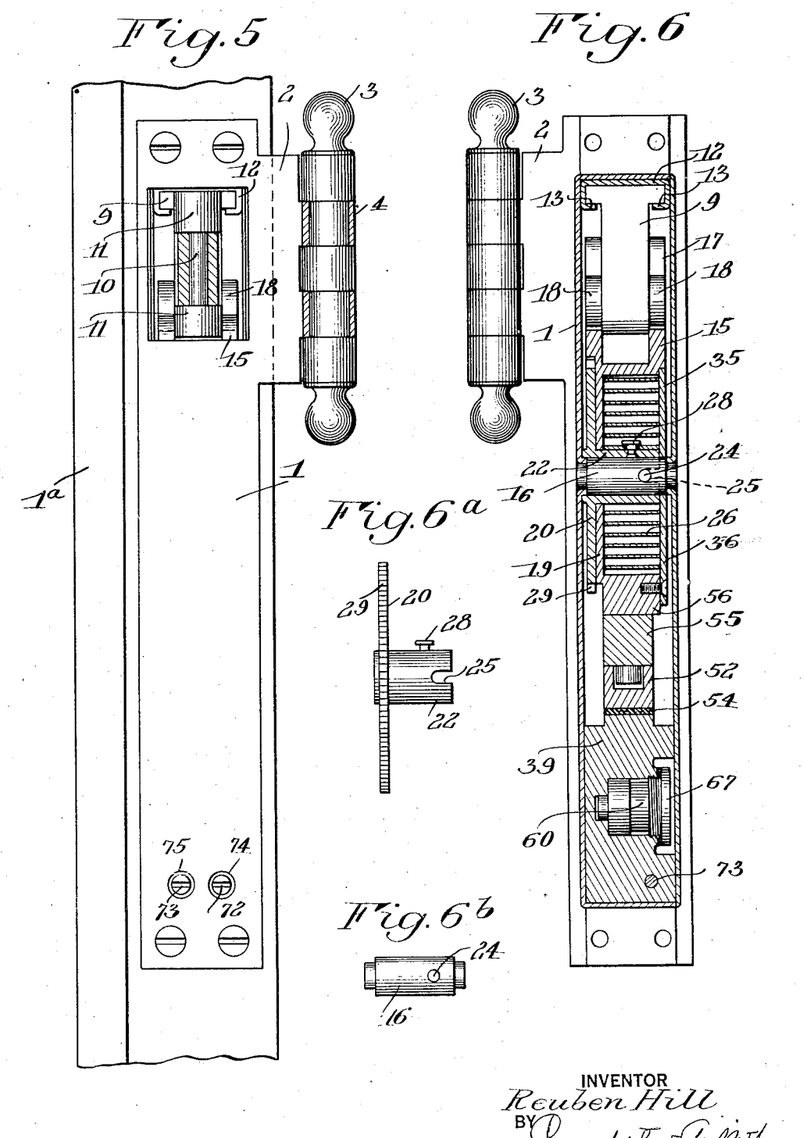
Fig. 5 is a vertical elevation, with certain parts in section, of the outside of the door jamb showing my device in position therein.
Fig. 6 is a vertical section taken on the line 6—6 of Fig. 1 looking in the direction of the arrows.
Figure 10:
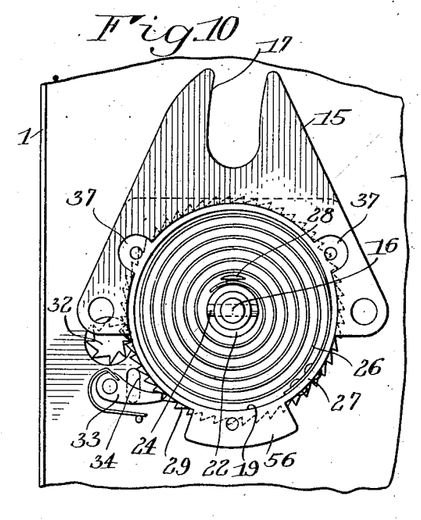
Fig. 10 is a detail fragmentary view of the master member with the cover plate for the spring removed.

I provide means for constantly urging the cam element 15 toward counter clockwise rotation around pin 16 as seen in Fig. 1. Referring to Fig. 6 it will be seen that the element 15 comprises a pair of upstanding forked portions formed at the top of a hollow cylindrical casing portion 19. A combined ratchet and gear wheel 20 is secured in a depression in the rear face of cam 15 and concentric with the cylindrical casing portion 19. A sleeve 22 is constructed integrally with the wheel 20 and projects forwardly from said wheel toward the front of the casing 1. A pin 16 is secured at its ends in the walls of the casing 1 and has an enlarged central portion 23 which bears at each end against the casing for the purpose of centering the pin 16 therein. The sleeve 22 fits around the enlarged portion 23 of pin 16 and is held from turning about said pin by a pin 24 which passes through a hole in pin 16 and is engaged in a notch 25 in the sleeve 22. (See Figs. 6, 6ª, 6ᵇ, and 10.)

Figure 18:
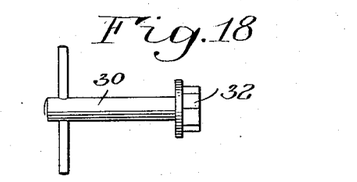
Fig. 18 is a detail of the winding key.

A coil spring 26 fits within the hollow cylindrical portion 19 of the cam 15 and is secured at its outer end to the inner face of the wall thereof at 27. The inner end of the coil spring 26 is secured by a pin 28 to the sleeve portion 22 of the gear element 20. (See Fig. 6.) The element 20 is provided with teeth 29 by means of which it may be rotated so as to wind the inner end of said spring around the sleeve 22 to produce the desired tensioning effect. A winding key 30 (see Fig. 18) is adapted to be inserted through a hole 31 in the face of the casing 1 so located as to cause the teeth 32 of the winding key to properly mesh with the teeth 29 on the element 20. It will be seen that by turning the winding key in a clockwise direction as shown in Fig. 10 the spring 26 will be tightened. I provide a spring pressed pawl 33 on the rear wall of casing 1 adapted to engage the teeth 32 to hold the element 20 from reverse movement. For the purpose of releasing the pawl 33, I provide a slot 34 in the face of casing 1 into which an implement may be inserted to depress the pawl to disengage it from teeth 29. By this means the tension in spring 26 may be readily diminished.

A plate element 35 closes the front of the hollow cylindrical portion 19 of cam 15 and is secured to the face of the cam by means of ears 36 adapted to be held in corresponding shaped depressions 37. The plate 35 is formed on its lower side with a hook shaped cam 38 for a purpose which will be later brought out.

Figures 2, 17:
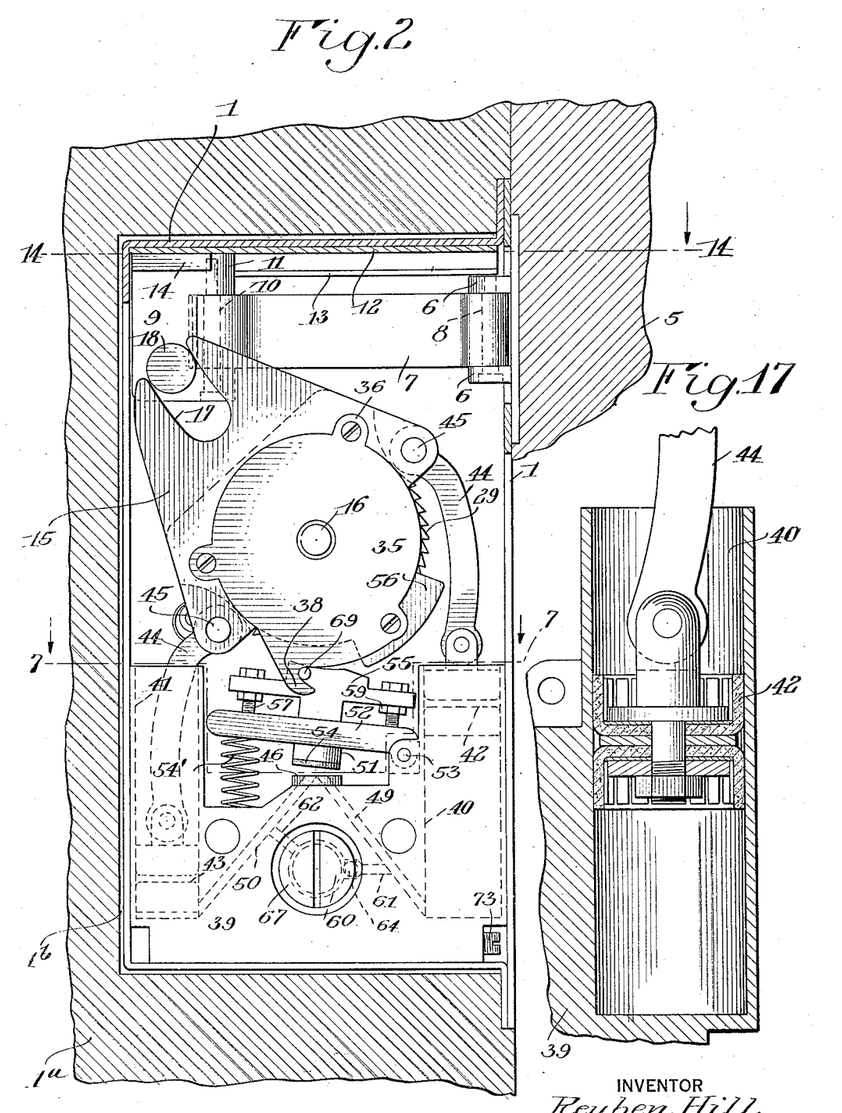
Fig. 2 is a view similar to Fig. 1 showing the positions of the parts when the door is closed.
Fig. 17 is a vertical section taken through one of the retarding cylinders.
Figure 7:
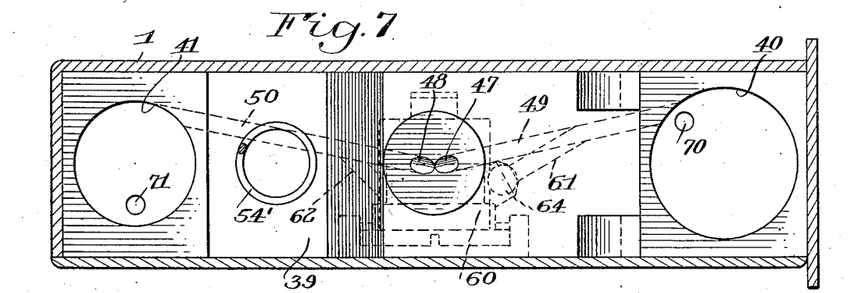
Fig. 7 is a horizontal section taken on the line 7—7 of Figure 2.

In the lower end of casing 1 I secure a casting 39 roughly shaped in the form of an inverted U. In the upstanding portions of the casting 39 I construct vertically extending cylinders 40 and 41. Cylinder 40 is somewhat larger than cylinder 41 for a purpose which will be hereinafter made clear. As shown in Fig. 1, the cylinder 40 operates by a vacuum and the cylinder 41 operates by pressure. Pistons 42 and 43 are provided respectively in the cylinders 40 and 41. Piston rods 44 are pivotally connected to each piston at their lower end and at their upper ends are pivoted to outstanding lugs 45 on the element 15. At the center of the U-shaped casting 39 I provide a flat portion 46 which is provided with two ports 47 and 48 as shown in Fig. 7, which form respectively the ends of ducts 49 and 50 leading to the lower ends of the respective cylinders 40 and 41. The ports 47 and 48 are adapted to be closed by a valve element indicated as 51 (see Figs. 1 and 2). The valve element 51 comprises a bar 52 pivoted at 53 on casting 39. The bar 52 has a disk 54 of leather or rubber suitably secured to the face thereof. This disk 54 is adapted to fit over and close the ports 47 and 48. The bar 52 is normally spring pressed upward in the direction tending to uncover the ports 47 and 48 by means of spring 54' bearing respectively at its upper and lower ends against the bar 52 and casting 39. An adjustable cam 55 provided with a curved cam face 55' is mounted on the upper side of bar 52. The curved cam face 55' is adapted to engage a cooperating face 56 on the cam 15. When the cam faces 55' and 56 are in contact as shown in Fig. 1, the valve disk 54 will be held down securely to cover the openings 47 and 48. It will be seen that when the cam 15 rotates in a counterclockwise direction as shown in Fig. 2, cam 56 will pass out of contact with the cam 55 thus showing the spring 54 to raise bar 52 carrying upwardly the valve disk 54 to uncover the openings 47 and 48. To compensate for wear of the disk 54, I prefer to mount the cam 55 for upward adjustment with relation to bar 52. This is accomplished by means of adjusting screws 57 inserted through holes 58 at the ends of the cam 55 and having their lower ends secured in the upper face of bar 52. Nuts 59 are threaded on bolts 57 and are adapted to bear upwardly against the lower side of the element 55 so as to hold the element in fixed position of the bolts 57. At this point it may be stated that the engagement between cams 55 and 56 may be made tight enough to produce a braking effect on the element 15 so as to give a more uniform retarding action.

Figure 8:
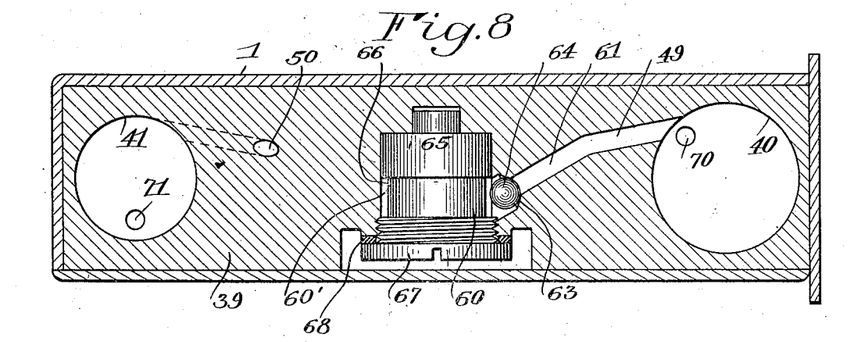
Fig. 8 is a horizontal section taken substantially on the line 8—8 of Figure 1.

It will be seen that when disk 54 is moved so as to uncover the ports 47 and 48 both cylinders 40 and 41 are in free communication with the atmosphere through the ducts 49 and 50. I provide a by-pass between the ducts 49 and 50 as shown in dotted lines in Fig. 1 and Fig. 7 and in full lines in Fig. 8. The by-pass includes a check valve 60 and ducts 61 and 62 connecting the valve with ducts 49 and 50. The check valve mechanism 60 is constructed in an opening 60' bored into the casting 39. This opening is connected with ducts 49 and 50 by means of short ducts 61 and 62. At the end of the passage 61, adjacent to the opening 60', I provide a seat 63 for a spherical valve member 64. Within the opening 60' I insert a plug 65 having a portion of its periphery cut away as at 66 to form a passage around the plug between the ducts 61 and 62. Plug 65 is held in place by a cap member 67 suitably screw-threaded within the opening 60. A tight joint is obtained between the flange on cap 67 and the casting 39 by means of a gasket 68.

The operation of the check valve serves to permit air to pass from cylinder 40 to cylinder 41 when the piston 42 is travelling downwardly of cylinder 40 and when the openings 47 and 48 are closed by the disk 54. This occurs when the door is being opened. It will be apparent that since cylinder 40 is larger than cylinder 41 a greater volume of air is displaced from cylinder 40 than is naturally drawn in to the cylinder 41 hence there will be a slightly increased pressure in both cylinders when the door is being opened. The increased pressure in the cylinders offers but slight resistance to the opening of the door. However when the door starts to close the initial pressure in the cylinder 41 increases its initial effectiveness to retard the closing movement so that the retarding effect of the cylinders will be substantially uniform. This arrangement is desirable for the reason that the initial vacuum produced in a cylinder, when the piston is moving outward, offers a higher resistance than an initial pressure in the same cylinder when the movement of the piston has been reversed.

Positive means may be provided for lifting the valve disk 54 from the openings 47 and 48. This comprises the cam hook 38 previously mentioned, which is adapted to cooperate with a lug 69 on the cam element 55 so as to bear upwardly on said lug 69 and lift the valve 51 when the cam element 15 has been oscillated to a position indicated in Fig. 2.

Figure 9:
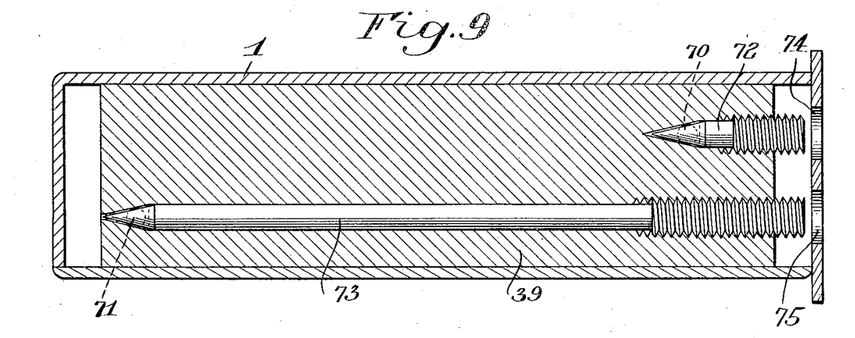
Fig. 9 is a horizontal section taken on the line 9—9 of Fig. 3, showing the adjustable metering or bleed valves for the vacuum and pressure cylinders.

Each of the cylinders 40 and 41 communicates with the atmosphere at their lower ends through passages 70 and 71. The passages 70 and 71 may be restricted to any desired amount by means of metering or bleed valves 72 and 73 (see Figs. 1 and 9) screw-threaded into the lower part of casting 39 so as to be adjustable in and out thereof. Apertures 74 and 75 are provided on the edge of the casing 1 to permit the insertion therethrough of a screw driver to engage the ends of needle valves 72 and 73. It will be seen that by this means I am able to regulate the speed with which the door will close.

In the operation of this form of my device assuming the parts are in the position shown in Fig. 2, it will be seen that the master member or cam element 15 has been swung to extreme left hand position within the casing 1 and the door 5 is closed, also the ports 47 and 48 for the cylinders 40 and 41 are uncovered. When the door is being opened the link 7 and crosshead 9 move outwardly to the right in Fig. 2. This also causes rotation of the cam element 15 by reason of its lug and slot connection with the crosshead 9. It is apparent that when the cam element 15 is rotated in this direction the tension on spring 26 will be increased.

Figure 3:
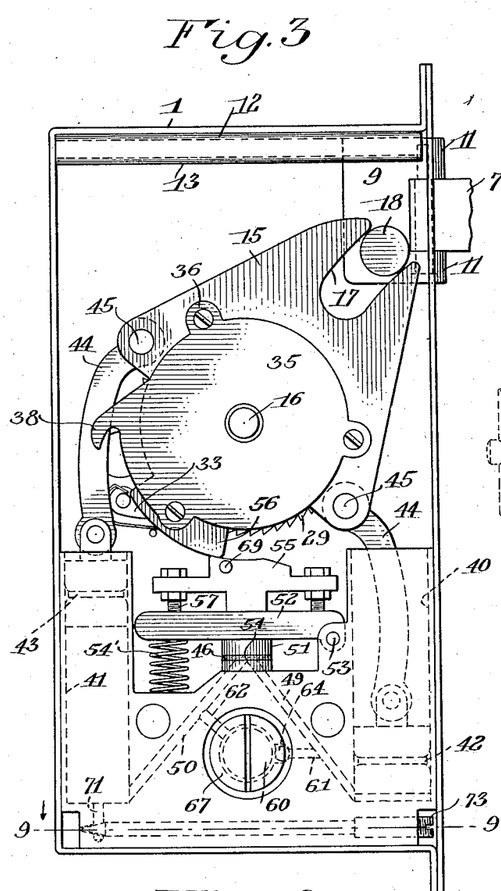
Fig. 3 is a view similar to Figures 1 and 2 showing the parts as they are when the door is in extreme open position.
Figure 4:
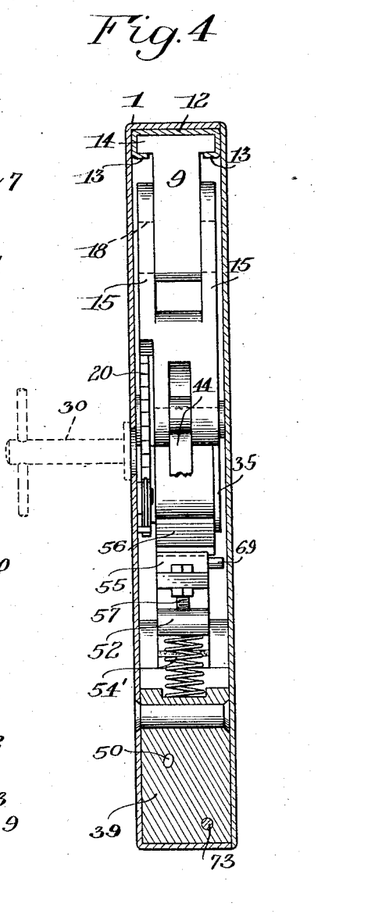
Fig. 4 is a transverse vertical section taken on the line 4—4 of Fig. 1 looking in the direction of the arrows.

As the cam element 15 rotates cam 56 on said element strikes the face 55' of cam 55, depressing the valve disk 54 to cover the openings 47 and 48, and it will be obvious that the valve disk 54 is held in downward position all during the time the door is opened until it has almost reached its closed position. With the ports 49 and 50 closed, the air in the lower end of the larger cylinder 40 passes through the check valve 64 and ducts 62 and 50 to the lower end of the smaller cylinder 41 in which the piston 43 is at this time moving upwardly, so it will be seen that the air is displaced from cylinder 40 into cylinder 41 and at the same time the pressure in both cylinders is slightly increased. This does not, however, appreciably increase the resistance to the opening of the door. When the door has reached its extreme open position the parts will be in the position shown in Fig. 3.

Assuming that the door is now released by the person opening it, the spring 26 will cause the cam element 15 to start to rotate in a counterclockwise direction, thus moving the crosshead to the left as shown in Fig. 1 and causing the door to start to close through the link connection between the door and crosshead. When the cam element 15 is moving counter clockwise the piston 43 will travel downwardly and the piston 42 will travel upwardly in their respective cylinders. This tends to create a partial vacuum in cylinder 40 and an elevated pressure in cylinder 41 since the ports 47 and 48 are closed and the check valve 60 will not permit flow of air from the cylinder 40 to cylinder 41.

It will be understood that during most of the closing movement of the door the pressure and vacuum conditions existing respectively in cylinders 41 and 40 will only be relieved through the metering or bleed valves 72 and 73 which allow only a very slow movement of air therethrough. Thus the two cylinders check the speed with which spring 26 would otherwise close the door.

The door closes at a relatively slow speed until within a few inches of its final closed position. When this point is reached, the cam 15 has swung far enough so that the cam face 56 passes free from the face 55' of cam 55 allowing the spring 54' to lift the valve disk 54 from the openings 47 and 48 causing a sudden release of the pressure and vacuum conditions within the cylinders 40 and 41 and allowing the spring 26 to exert its full effect upon the door. This speeds up the door sufficiently so that the usual latch will be properly operated.

I have described the cylinders as operating with air pressure but it is also within the scope of my invention to operate said cylinders with liquid. The term "fluid" therefore is used herein in a generic sense including both gases and liquids.

In case the spring 54' fails for any reason to properly lift the valve disk 54 the cam hook 38 engages under lug 69 and postively lifts the parts so as to separate the valve disk 54 from the openings 47 and 48.

Figures 19, 20:
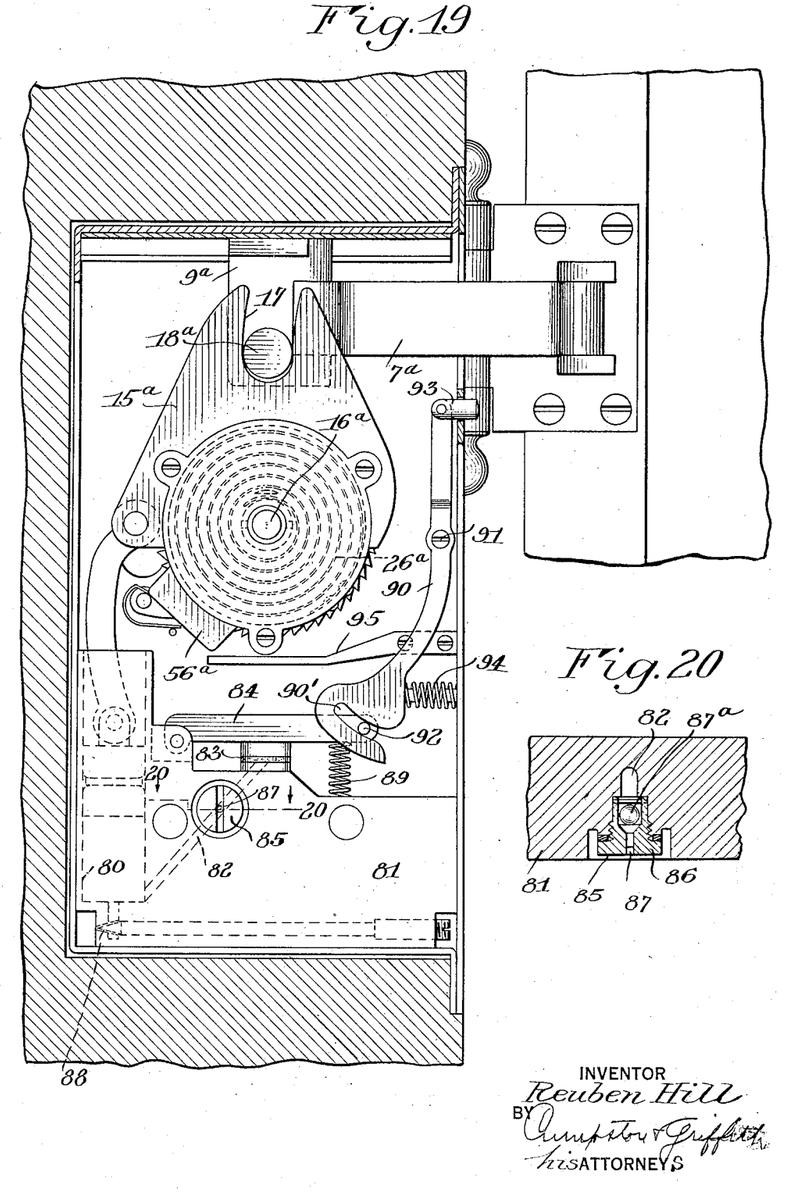
Fig. 19 is a sectional view illustrating a modified form of the device.
Fig. 20 is a sectional view on line 20—20 of Fig. 19 showing the check valve used with this modification.

In the modification disclosed in Figs. 19 and 20, I have shown but a single retarding cylinder 80 provided in the casting 81, similar to casting 39. A duct 82 leading from the lower end of the cylinder 80 has its upper end closed by a valve 83 provided on bar 84. A check valve generally indicated at 85 (see Fig. 20) is provided in the cylinder casting 81. This valve serves to control communication between the duct 82 and the atmosphere. A hollow plug member 86 is provided with an inlet 87 communicating with the hollow portion; the plug is screwed into a hole formed in the casting and said hole connects with the duct 82. A valve seat is provided in the hollow portion of the plug and cooperating with said seat is a ball valve member 87$^a$. When the piston is travelling upward in cylinder 80 the check valve 85 is automatically opened to allow air to pass freely therethrough to the cylinder. The check valve closes, however, when the piston is travelling downward by reason of the pressure forcing the ball member against its seat. When the check valve is closed, air may pass slowly from the cylinder to the atmosphere through the metering valve 88 similar to the valve 73 in Fig. 1.

The operating means for the valve 83 in this form of the invention comprises, a spring 89 adapted to normally lift the valve to uncover the end of duct 82, and a cam releasing element 90. The releasing element 90 comprises a link pivoted at 91 to the casing 1$^a$. The lower end of the link is widened and has formed therein a segmental slot 90' adapted to engage a lug 92 on the rod 84. The slot is eccentric to the pivot point 91 of link 90 so that the upper end of said slot, as seen in Fig. 19, lies somewhat closer to pivot 91 than the lower end. This arrangement provides means for lifting the valve 83 when the link 91 is swung counter-clockwise.

A plunger 93 is pivotally connected to the upper end of link 90 above pivot 91. The plunger projects through a hole in the casing 1$^a$ and lies in a position so that its end will be struck by the hinge of the door as it closes, thus causing the upper end of link to swing back and moving the segmental slot along the lug 92 to force it upward and thus raise valve 83 to uncover the upper end of duct 82. A compression spring 94 bears at one end against the link 90 and at the other end against the inner wall of casing 1 and serves to hold the lower end of link 90 to its extreme left position as viewed in Fig. 19.

The link 7$^a$ and crosshead 9$^a$ are in all respects similar to links 7 and 9. The cam element 15$^a$ differs from cam 15 by the fact that it has but the single link connection to cylinder 80 and in place of the curved cam face 56 I have provided a cam portion 56$^a$ having a flat surface which lies at right angles to a radial line through the pin 16$^a$ on which cam 15$^a$ is mounted.

A spring 95 is fixedly secured at one end to the casing 1ª and projects across the casing in a position to engage cam 56ª. It will be seen that this spring 95 serves to aid in the retarding action of the door to some extent until a point is reached where the door is nearly closed and the corner of cam 56ª has reached the center of its movement and no longer depresses the spring 95. When the flat face of cam 56ª is in engagement with spring 95 it will be seen that there be a latching action, that is, the parts will be frictionally held in this position and it will take slightly more force to move the door for the first few inches of its movement than it will after the cam 56 and spring 95 have separated.

Summing up the operation of this modification it will be apparent that when the door is closed the valve 83 will be raised and the flat surface of cam 56ª will be in engagement with spring 95. Upon opening the door the movement will be opposed to a slight extent by the corner of the flat surface 56ª riding along and depressing the end of spring 95, however, after the spring has been depressed as far as the cam 56ª will make it move there is no longer any resistance offered to the opening movement.

When the door has been opened a short distance it will be seen that the hinge passes out of contact with the end of plunger 93 allowing it to move outwardly due to the force of spring 94 at the lower end of link 90 and when this occurs the slot 90' moves along the lug 92 forcing it down and seating the valve disk 83 to close the duct 82.

The cylinder 80 is open to the atmosphere, while the door is being opened, by the provision of the check valve which offers no resistance to air passing into the cylinder.

When the opened door has been released the spring tensioned cam 15ª serves to draw it closed and forces the piston downwardly in cylinder 80. The air displaced by the piston passes slowly out the valve 88 and no air can escape out the passage 82 by reason of the check valve being forced against its seat and by reason of the valve 83 being in closed position. When the door reaches a point a few inches from closed position the hinge will strike plunger 93, moving the link 90 and lifting valve 83. The air will now rush into cylinder 80 through passage 82 and the spring 26ª as well as spring 95 will accelerate the closing action to snap the door shut.

Figures 21, 22:
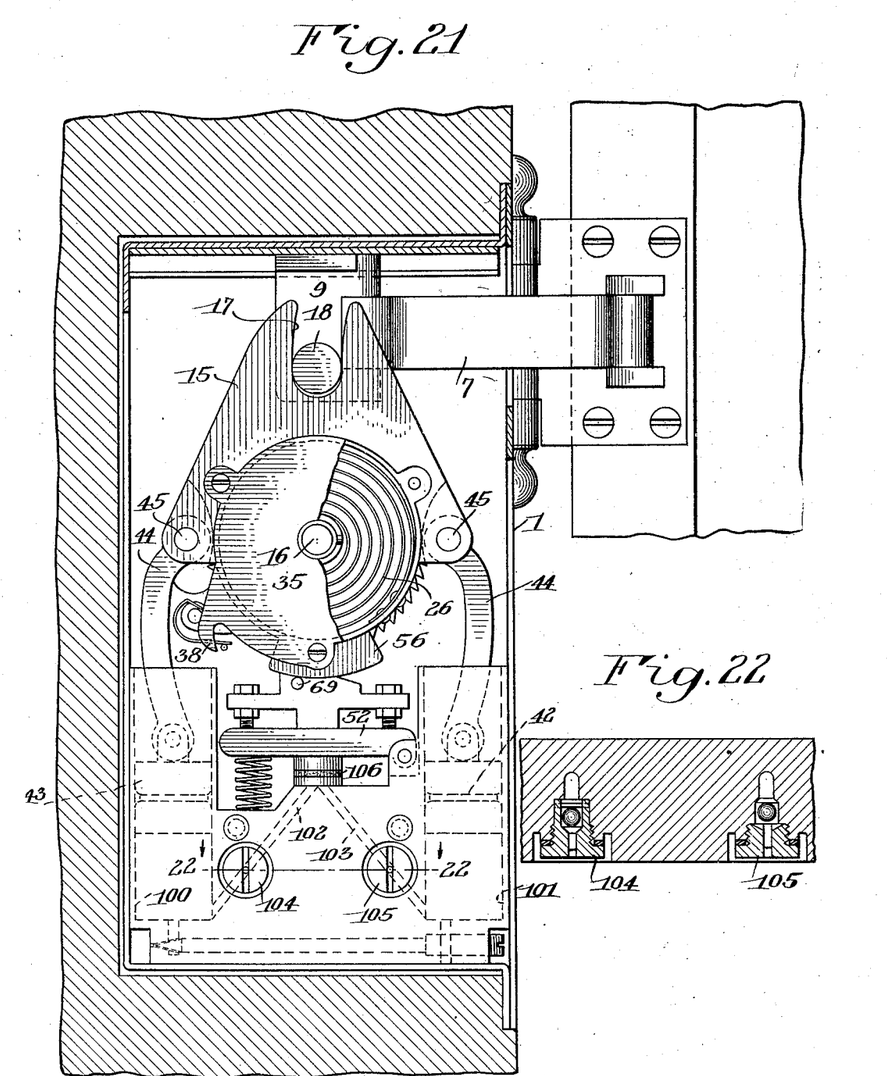
Fig. 21 is a sectional view similar to Fig. 19 but showing a still further modification.
Fig. 22 is a sectional view taken on line 22—22 showing the check valves used with the latter modification.

The modified form shown in Figs. 21 and 22 is practically like that shown in Fig. 1 with the exception that the cylinders are independent of each other. The cylinders 100 and 101 are provided with ports leading into ducts 102 and 103 respectively. Check valves 104 and 105 similar to check valve 85 in Fig. 19 are used to provide one-way communication between the passages 102 and 103 to the atmosphere. The passageways 102 and 103 terminate in ports closed by valve 106 similar to the arrangement of Fig. 1.

The operation of this modification is the same as in Fig. 1 with the exception that when the door is being moved to open position the check valves open to connect the interior of the cylinders with the atmosphere instead of with each other. The valve 104 opens inward to allow air to enter beneath the upwardly moving piston in the cylinder 100 and the valve 105 opens outward to allow air to escape from under the downwardly moving piston in cylinder 101.

When the door is swinging closed the check valves 104 and 105 remained in closed position so that all of the air must pass into cylinder 101 and out of cylinder 100 through their respective metering valves in a manner explained in connection with Fig. 1.

I claim as my invention:

1. In a door closing device, the combination of a door, a door jamb having a chamber provided therein, a pivotally mounted element in said chamber, a slidably mounted operating member for said element, a link connecting said member with said door, and a spring operatively associated with said element and tending to move it in one direction, whereby said door is urged to a closed position.

2. In a door closing device, the combination of a door, a door jamb having a chamber provided therein, an element in said chamber pivotally mounted on an axis transverse to the plane of the door in closed position, a link operatively connected with said element, a link connecting said slide with said door, and a spring operatively associated with said element and tending to move it in one direction about its pivotal axis, whereby said door is urged to a closed position.

3. In a door closing device, the combination of a door, a door jamb having a chamber provided therein, a pin supported within said chamber and positioned with its longitudinal axis transverse to the plane of said door in closed position, an element pivotally mounted upon said pin, a slide for moving said element in opposite directions, a link connecting said slide with said door, and spring means associated with said element and tending to move it in one direction about its pivotal axis, whereby said door is urged to a closed position.

4. In a door closing device, the combination of a door member, a door jamb member, one of said members having a chamber therein, an element in said chamber pivotally mounted on an axis transverse to the plane of the door member when in closed position, a bodily movable part operatively connected with said element, a link connected at one end to said part and connected at its opposite end to one of said members, guide means for said part and spring means operatively associated with said element and tending to move it in one direction about its pivotal axis whereby said door member is urged to a closed position.

5. In a door closing device, the combination of a door, a door jamb having a chamber provided therein a pivotally mounted element in said chamber, a spring operatively associated with said element and tending to move it in one direction, an operating member for said element arranged to slide thereon and a link connecting said member with said door whereby when the door is opened the action of said member on said element serves to increase the tension of said spring.

6. In a door closing device, the combination of a door, a door jamb having a chamber provided therein, an element in said chamber pivotally mounted on a horizontal axis, a link connecting said element and said door, means tending to turn said element in one direction about its pivotal axis whereby said door is urged to a closed position, retarding means connected with said element tending to check its movement in the door closing direction, and means for decreasing the retarding action of said retarding means when the door approaches closing position whereby to quicken the movement thereof.

7. In a door closing device, a casing arranged for insertion in a chamber in a door jamb, a crosshead slidable in said casing, a link connected at one end to said crosshead and having its other end arranged for connection with a door, a lug on said crosshead, an element pivotally mounted in said casing and being constructed with a bifurcated extension, said extension being arranged to engage said lug between its bifurcations, spring means associated with said element tending to move it in one direction about its pivotal axis, retarding means associated with said element for opposing the action of said spring means, said retarding means comprising a vacuum cylinder and a pressure cylinder, pistons in said cylinders connected respectively to said element on opposite sides of its pivotal axis, and means for controlling the retarding action of said cylinders whereby said retarding action is decreased at a predetermined point in the movement of said element about its pivotal axis.

8. In a door closing device, in combination, a door jamb having a chamber extending longitudinally thereof, an elongated casing secured within said chamber to lie longitudinally of said jamb, a pin secured within said casing having its axis transverse to the plane of the jamb, a member pivotally mounted on said pin, link means for operatively connecting said member to a door, means associated with said member tending to turn it in one direction about the axis of said pin so that the parts will tend to move in the door closing direction, retarding means for said member for opposing its movement in the door closing direction, and means associated with said retarding means for decreasing its retarding effect when the door approaches closing position whereby to quicken the movement thereof.

9. In a door closing device, a pivoted element, means for connecting said element to a door, spring means associated with said element tending to move it in one direction about its pivotal axis, whereby the door is urged to a closed position, projections on said element on opposite sides of said axis, retarding means associated with said element comprising cylinders, pistons in said cylinders, piston rods connecting said pistons with said projections, whereby pivotal movement of said element in the door closing direction tends to move one piston up and the other down, thus creating respectively reduced and increased pressures in said cylinders, ducts connected with said cylinders, said ducts terminating in spaced ports, closure means for said ports, and means acting at a predetermined point in the movement of said pivoted element in the door closing direction for removing the closure means from said ports, whereby each cylinder is connected with the outside atmosphere to thus decrease its retarding effect.

10. In a door closing device, a pivoted element adapted to be mounted within a door jamb, means for connecting said element to a door, spring means associated with said element tending to move it in one direction about its pivotal axis, means for retarding the action of said spring on said element, said means comprising pressure and vacuum cylinders, pistons in said cylinders, piston rods connected at one end to said pistons and at the other end to said element on opposite sides of its pivotal axis ducts connecting said cylinders with the atmosphere, closure means for simultaneously closing said ducts and means for opening said closure means at a predetermined point in the movement of said element about its pivotal axis, whereby the retarding effect of said cylinders is decreased.

11. In a door control device, a pivoted element, spring means acting on said element tending to move it in one direction, retarding means for opposing the movement of said element in such direction, said retarding means comprising a pair of cylinders, pistons in said cylinders, projections on said element on opposite sides of its pivotal axis, rods connecting said pistons and said projections, the arrangement being such that when said element is turned about its pivotal axis by said spring means, one piston will move in a direction to reduce the pressure in its cylinder and the other will move in a direction to increase the pressure in its cylinder, and a common valve associated with said cylinders permitting free movement of the pistons when said element is turning in a direction opposite to that caused by said spring means.

12. In a door control device, a pivoted element, spring means acting on said element and tending to move it in the door closing direction, a fluid operated retarding means for opposing the movement of said element in such direction, said retarding means comprising a pair of cylinders, pistons in said cylinders, piston rods connected with said pistons at one end and being connected at their other ends to said element, the arrangement being such that when said element is turned about its pivotal axis by said spring means the pistons will move in a direction tending respectively to increase and decrease the pressure in their respective cylinders, a duct connecting said cylinders, a check valve in said duct permitting a flow of fluid displaced from one cylinder into the other in one direction only, and a restricted passage between the atmosphere and the interior of each cylinder.

13. In a door closing device, a pivoted element adapted to be mounted in a door jamb, means for connecting said element to a door, spring means associated with said element tending to move it in one direction about its pivotal axis, means for retarding the action of said spring on said element, said means comprising pressure and vacuum cylinders, pistons in said cylinders, piston rods connected at one end to said pistons and at their other ends to said element on opposite sides of its pivotal axis, ducts connecting said cylinders with the atmosphere, closure means for simultaneously closing said ducts, means for opening said closure means at a predetermined point in the movement of said element about its pivotal axis, whereby the retarding effect of said cylinders is decreased, a by-pass connecting said ducts intermediate their ends, and a check valve for said by-pass operative to allow movement of air from one cylinder to the other when said element is moving on its axis in the door opening direction.

14. In a door closing device, the combination of a door, a door jamb having a chamber provided therein a flat elongated casing positioned in said chamber to lie longitudinally of said jamb and having an aperture in the edge thereof adjacent the edge of the door, a link movable endwise through said aperture and being connected at its outer end to said door, a pin secured within said casing and positioned transversely to the plane of the door when in closed position, an element mounted for pivotal movement on said pin, said element being connected above its pivotal axis to the inner end of said link, spring means associated with said element tending to move the same about its pivotal axis in a direction to close said door, and retarding means positioned within said casing, below said element and operatively connected thereto so as to oppose the action of said spring means throughout the greater part of the closing movement of said door and arranged when the door approaches closing position to decrease the retarding effect whereby the spring means will quicken the movement of the door.

15. In a door closing device, a flat elongated casing arranged to be positioned longitudinally within a door jamb and having an aperture in the edge thereof, a link movable endwise through said aperture and having its outer end arranged for connection to a door, a pin secured within said casing positioned transverse to the length thereof, an element pivotally mounted on said pin, said element being connected above its pivotal axis to the inner end of said link, spring means associated with said element tending to move the same about its pivotal axis in a direction to close the door, retarding means positioned within said casing below said element and operatively connected thereto so as to oppose the action of said spring means, and means associated with said retarding means for decreasing its retarding effect when the door approaches closing position whereby to permit of a quickened closing movement thereof.

16. In a door closing device, a flat elongated casing arranged to be secured longitudinally within a door jamb and having an aperture in the edge thereof, a link movable endwise through said aperture and having its outer end arranged for connection to a door, a pin in said casing positioned transversely to the length thereof, an element pivotally mounted on said pin, a fixed guide mounted on said casing independently of said element, a slide movable upon said guide and operatively connected with said element at a point above its pivotal axis and connected to the inner end of said link, spring means associated with said element tending to move the same about its pivotal axis in a direction to close the door, retarding means positioned within said casing, below said element and operatively connected thereto so as to oppose the action of said spring means, means associated with said retarding means for rendering the same ineffective during the movement of said element in door opening direction and effective during its movement in door closing direction, and additional means associated with said retarding means for decreasing its retarding action at a predetermined point in the movement of said element in the door closing direction.

17. In a door control device, a pivoted element, spring means acting on said element and tending to move it in a door closing direction, fluid operated retarding means for opposing the movement of said element in such direction, said retarding means comprising a pair of cylinders, one of which is of larger internal diameter than the other, pistons in said cylinders, projections on said element on opposite sides of its pivotal axis, rods connecting said pistons and said projections, the arrangement being such that when said element is turned about its pivotal axis against the action of said spring means the piston in the larger cylinder will move in a direction to increase the pressure therein and the piston in the smaller cylinder will move in a direction to decrease the pressure therein, a duct connecting said cylinders, and a check valve in said duct permitting flow of air from the larger to the smaller of said cylinders when the piston in said larger cylinder is moving in a direction to compress the air therein, thereby creating a pressure in said smaller cylinder.

18. In a door closing device, a casing arranged for insertion within a door jamb, an element pivotally mounted in said casing, an aperture in said casing, a link movable through said aperture and having its inner end connected to said element above its pivotal axis, the outer end of said link being arranged for engagement with a door, a spring associated with said element tending to move it about its pivotal axis in a direction to close the door, a retarding device positioned within said casing below said element, said retarding device comprising a pair of vertically positioned cylinders, pistons in said cylinders, projections on said member on each side of its pivotal axis, rods connecting said pistons and said projections, the parts being so arranged that one of said pistons will move upwardly and the other downwardly upon pivotal movement of said element, ducts leading from said cylinders, said ducts terminating in spaced ports, a closure for said ports, means for holding said closure in operative position to close the ports, and means for removing said closure from said ports at a predetermined point in the closing movement of the door, and valve means connected with said ducts permitting communication between said cylinders and the atmosphere through said ducts only during the opening movement of the door.

19. In a door closing device, a casing arranged for insertion within a door jamb, an element pivotally mounted in said casing, a link connected at its inner end to said element above its pivotal axis and being arranged at its outer end for connection with a door, a spring associated with said element tending to move it about its pivotal axis in a direction to close the door, a retarding device positioned within said casing below said element, said retarding device comprising a pair of vertically positioned cylinders, pistons in said cylinders, projections on said member on each side of its pivotal axis, rods connecting said pistons and said projections, the parts being so arranged that one of said pistons will move upwardly and the other downwardly when said member moves about its pivotal axis, ducts leading from said cylinders and terminating in spaced ports, closure means for said ports, means for operating said closure means, means for actuating said operating means to open said ports at a predetermined point in the closing movement of the door, valve means connected with said cylinders permitting free communication between said cylinders and the atmosphere only during the opening movement of the door, and a restricted passage connecting each cylinder and the atmosphere.

20. A door closing device for operation between a door member and a door jamb member comprising a frame arranged to be fixed upon one of said members, an element pivotally mounted on said frame for a swinging movement thereon, a fixed guide mounted on said frame independently of said element, a part slidable upon said guide and arranged to slide upon said element for swinging it in one direction, a link connected with said part and arranged for connection with the other of said members for operation thereby, means acting on said element when the door member is opened tending to swing the latter to a closed position, retarding means associated with said element for opposing movement of said door member in a closing direction, and control means for said retarding means arranged to decrease its retarding effect when said door member approaches closing position whereby to permit of a quickened closing action of said door member.

21. A door closing device for operation between opposing door and door jamb members comprising a frame arranged to be fixed upon one of said members, an element pivotally mounted on said frame for a swinging movement thereon, a fixed guide mounted on said frame independently of said element, a device slidable upon said guide and movable relatively to and arranged to slide upon a portion of said element to swing it in one direction, a link having one end connected with said device and the other arranged for connection with the member opposing said last mentioned member, means acting on said element when the door member is opened tending to swing it in a direction to close the door member, and retarding means associated with said element for opposing movement of said door member in a closing direction and arranged to decrease the retarding effect when said door member approaches closing position.

22. A door closing device for operation between opposing door and door jamb members comprising a frame arranged to be secured upon one of said members, an element pivoted upon said frame, a fixed guide mounted on said frame independently of said element, a device slidable upon said guide and having a part in sliding engagement with said element for swinging it in one direction upon opening said door member, means tending to urge said element in a direction to close said door member, a part pivotally connected at one end of said device and having its other end arranged for connection with the member opposing said last mentioned member and retarding means for said element tending to retard said door member during the closing movement thereof.

23. A door closing device for operation between opposing door and door jamb members comprising a frame arranged to be secured in one of said members, an element pivoted upon said frame, a fixed guide secured to said frame independently of said element, a slide movable upon said guide and having a part arranged to engage said element to swing it in one direction, operating means for said slide engaging the latter and arranged to be connected with the member opposing said last mentioned member for moving said pivoted element in one direction when the door member is being opened, means acting on said element for returning the door member to closed position, and means associated with said element tending to retard its movement during the closing movement of said door member.

24. A door closing device for operation between opposing door and door jamb members comprising a frame arranged to be secured in one of said members, an element pivoted upon said frame, a fixed guide mounted on said frame independently of said element, a slide movable upon the guide and having a part arranged to engage said element to swing it in one direction, operating means for said slide engaging the latter and arranged to be connected with the member opposing said last mentioned member for moving said pivoted element in one direction when the door member is being opened, means acting on said element for returning the door member to closed position, and pneumatic means associated with said element tending to retard its movement during the closing movement of said door member and arranged to decrease the retarding action when the door member approaches closing position to permit of a relatively quick movement of the door member to closed position.

25. A door closing device for operation between a door member and door jamb member, comprising a frame arranged to be fixed in one of said members, an element pivotally mounted on said frame for swinging movement thereon, a fixed guide mounted on said frame independently of said element, a part slidable upon said guide and in sliding engagement with said element and having a portion arranged for connection to the other of said members for operation thereby, means acting on said element when the door member is opened tending to swing the latter to a closed position, retarding means associated with said element for opposing movement of said door member in a closing direction, control means for said retarding means arranged to decrease its retarding effect when said door member approaches closing position whereby to permit of a quickened closing action of said door member, and a spring pressed brake arranged to frictionally engage said element for a portion of the closing movement of said door member.

REUBEN HILL.